US010860659B1

(12) United States Patent
Verma et al.

(10) Patent No.: US 10,860,659 B1
(45) Date of Patent: Dec. 8, 2020

(54) DISTRIBUTED VERIFICATION OF DIGITAL WORK PRODUCT

(71) Applicant: Amazon Technologies, Inc., Seattle, WA (US)

(72) Inventors: Prashant Verma, Seattle, WA (US); Ronil Mokashi, Mercer Island, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 274 days.

(21) Appl. No.: 16/123,655

(22) Filed: Sep. 6, 2018

(51) Int. Cl.
*G06F 17/21* (2006.01)
*G06F 16/93* (2019.01)
*G06F 40/197* (2020.01)
*G06F 21/62* (2013.01)

(52) U.S. Cl.
CPC ............ *G06F 16/93* (2019.01); *G06F 40/197* (2020.01); *G06F 21/6272* (2013.01)

(58) Field of Classification Search
CPC ..... G06F 16/93; G06F 40/197; G06F 21/6272
USPC .......................................................... 705/51
See application file for complete search history.

(56) References Cited

U.S. PATENT DOCUMENTS

| 10,606,576 | B1* | 3/2020 | Tung | G06F 9/54 |
| 10,642,643 | B2* | 5/2020 | Qiu | G06F 9/4837 |
| 10,678,866 | B1* | 6/2020 | Ranganathan | G06F 16/211 |
| 2017/0206523 | A1* | 7/2017 | Goeringer | G06Q 20/409 |
| 2017/0237569 | A1* | 8/2017 | Vandervort | H04L 9/3247 713/171 |
| 2018/0341648 | A1* | 11/2018 | Kakavand | G06Q 50/18 |
| 2019/0013934 | A1* | 1/2019 | Mercuri | H04L 9/0637 |
| 2019/0228369 | A1* | 7/2019 | Duval-Igarta | G06Q 40/02 |
| 2019/0294762 | A1* | 9/2019 | Prem Bianzino | G06F 21/16 |
| 2019/0354967 | A1* | 11/2019 | Lee | G06F 16/1834 |
| 2019/0372772 | A1* | 12/2019 | Novotny | H04L 9/3236 |

FOREIGN PATENT DOCUMENTS

| WO | WO-2017011293 A1 * | 1/2017 | G06F 3/065 |
| WO | WO-2017136879 A1 * | 8/2017 | H04L 9/0891 |
| WO | WO-2019144234 A1 * | 8/2019 | |
| WO | WO-2020012156 A1 * | 1/2020 | G06F 21/60 |

OTHER PUBLICATIONS

Proof of Existence, Wikipedia, retrieved from the internet on Sep. 6, 2018, https://en.wikipedia.org/wiki/Proof_of_Existence.

* cited by examiner

*Primary Examiner* — James D Nigh
(74) *Attorney, Agent, or Firm* — Thomas | Horstemeyer, LLP

(57) ABSTRACT

Disclosed are various embodiments for distributed verification of digital work product. A blockchain management application receives corresponding updates to a plurality of documents within a time interval. The blockchain management application then generates a single work product record in a blockchain. The single work product record evidences corresponding states of the plurality of documents at an end of the time interval.

20 Claims, 5 Drawing Sheets

US 10,860,659 B1

DISTRIBUTED VERIFICATION OF DIGITAL WORK PRODUCT

BACKGROUND

In research and development laboratories, it is very important for researchers to track their work and progress. For example, researchers may record their hypotheses, experiments, and initial analysis or interpretation in laboratory notebooks. The notebook serves as an organizational tool, a memory aid, and can also have a role in protecting any intellectual property originating from the research or for aiding a case with a regulatory authority, such as the Food and Drug Administration. A laboratory notebook is often maintained to be a legal document and may be used as evidence in court.

Laboratory notebooks have some very common guidelines that are primarily intended towards preventing doctoring of results in the past and establishing indisputable timelines for experiments and readings. There are some very common guidelines for laboratory notebooks to achieve this goal. For instance, the notebooks are typically permanently bound with numbered pages, dates are supplied as a rule, and entries are with permanent ink and written contemporaneously. The notebooks are intended to be the original place of data record and do not contain data copied from other sources. In laboratories with several staff members and a common laboratory notebook, notebook entries are signed and dated on each page by the author. Laboratories and researchers may be required to have their notebooks inspected, audited, and signed off by another scientist who can read and understand it. These guidelines can be useful in proving when a discovery was made, that a result is not fabricated, and that the work is original.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to distributed verification of digital work product, such as laboratory notebooks and other records. Despite the guidelines typically followed for traditional laboratory notebooks, the potential may still exist for records to be inaccurate. For instance, researchers may unintentionally or intentionally forget to record dates and certain information, or may record incorrect dates.

Simply translating a paper laboratory notebook into an electronic model does not solve these issues. On electronic systems, a bad actor may infiltrate the computing system and alter records purposefully. Third-party system providers might also be susceptible to hacking or purposeful alteration by bad actors. Moreover, electronic laboratory notebook systems may come and go, and verification of records may become impossible if the system is no longer supported by its original provider.

Various embodiments of the present disclosure introduce a distributed system for the verification of digital work product to overcome these issues with traditional paper laboratory notebooks and electronic laboratory notebooks. Blockchain technology is used to provide a distributed record of digital work product. A blockchain is a distributed database that is used to maintain a continuously growing list of records, called blocks. Each block contains a timestamp and a link to a previous block. A blockchain is typically managed by a peer-to-peer network collectively adhering to a protocol for validating new blocks. Blockchains are by their nature resistant to data modification. Once recorded, the data in any given block cannot be altered without the alteration of all subsequent blocks and the collusion of the entire network. Through the use of blockchain as will be described, the issue of altered laboratory notebooks or other digital work product can be avoided.

As one skilled in the art will appreciate in light of this disclosure, certain embodiments may be capable of achieving certain advantages, including some or all of the following: (1) providing for distributed verification of digital work product through the use of encryption or cryptographic hashes, thereby improving computer security and avoiding reliance on a single third-party for auditing; (2) providing distributed storage of evidence of digital work product across systems operated by potentially many different parties, thereby providing redundancy and avoiding data loss due to system crashes or hardware failures; (3) providing an open architecture that reduces reliance on proprietary software or hardware systems for auditing documents; (4) providing implementations that may reduce data storage requirements (e.g., a blockchain that stores a hash of a document rather than the entire document), and so forth.

Figure 1:
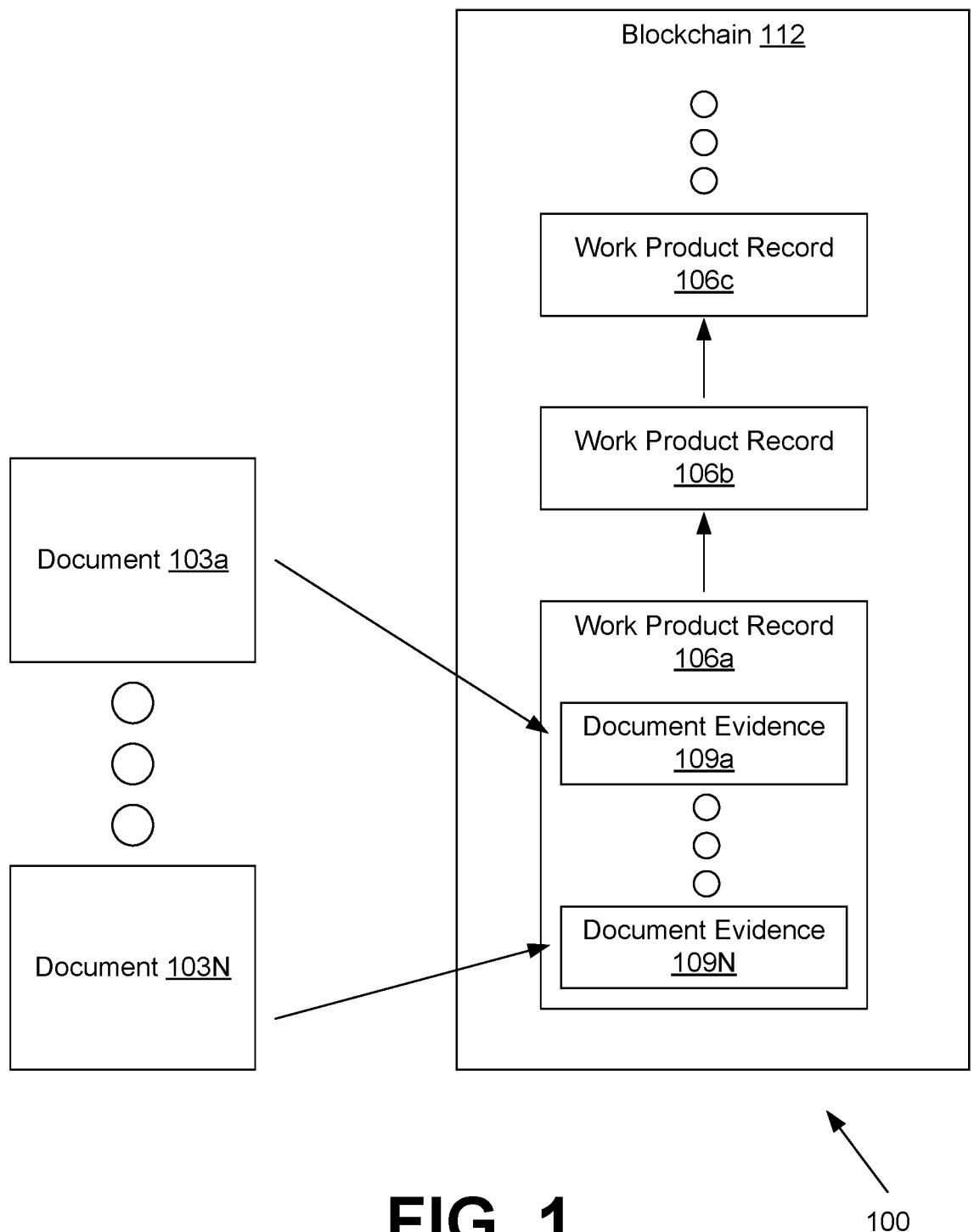
FIG. 1 is a drawing of an example scenario illustrating how evidence of documents may be recorded for distributed verification according to one or more embodiments of the present disclosure.

Turning now to FIG. 1, shown is an example scenario 100 illustrating how evidence of documents may be recorded for distributed verification according to one or more embodiments. One or more users at an organization may create or modify a plurality of documents 103a . . . 103N within a given time period. The documents 103 may be word processing files, text files, data files, or other types of digital documents. Based upon the current state of the documents 103 at the end of a predefined time period (e.g., every hour), a single work product record 106a is generated.

Among other data, the work product record 106 includes document evidence 109a . . . 109N corresponding to evidence of the state of the documents 103a . . . 103N at the end of the time period. The document evidence 109 may correspond to a hash value of the corresponding document 103, an encrypted version of the corresponding document 103, a hash value of a difference between the corresponding document 103 and an earlier version of the corresponding document 103, an encrypted version of the difference between the corresponding document 103 and an earlier version of the corresponding document 103, or other data that evidences the state of the corresponding document 103.

The work product record 106a is inserted into a blockchain 112, where the work product record 106a points to a previous work product record 106b, which in turn points to a previous work product record 106c, and so forth. The links between the work product records 106 may be a hash value of the previous work product record 106, which confirms the identity and integrity of the previous work product record 106. The blockchain 112 may be accessible to users of different organizations and possibly the general public. Thus, once a work product record 106 is added to the blockchain 112, the work product record 106 cannot be deleted or altered. In the following discussion, a general description of the system and its components is provided, followed by a discussion of the operation of the same.

Figure 2:
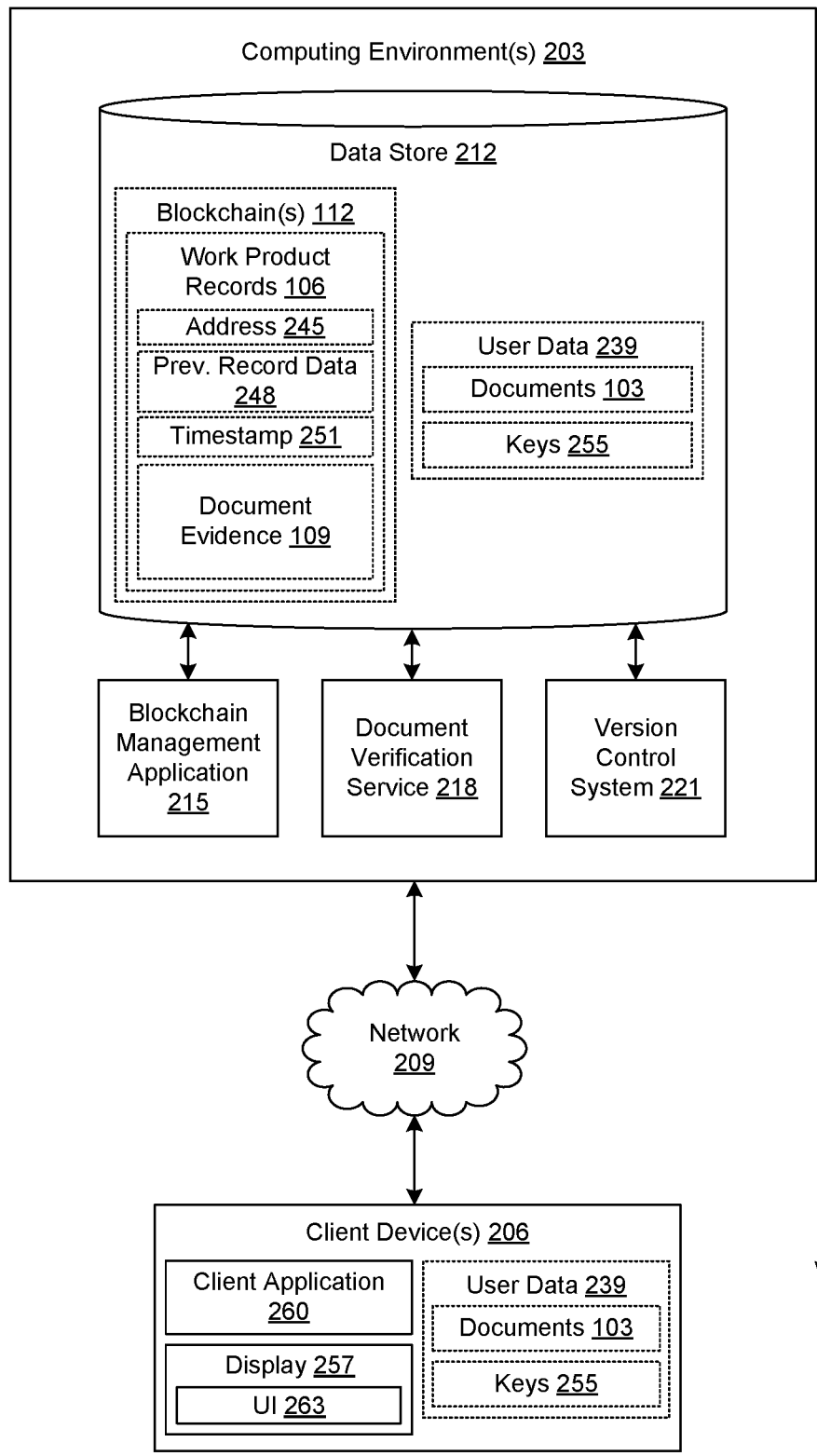
FIG. 2 is a schematic block diagram of a networked environment according to various embodiments of the present disclosure.

With reference to FIG. 2, shown is a networked environment 200 according to various embodiments. The networked environment 200 includes one or more computing environments 203 and one or more client devices 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time. As contemplated herein, multiple computing environments 203 may be operated by multiple independent parties that have agreed to integrate into the same blockchain.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a blockchain management application 215, a document verification service 218, a version control system 221, and other applications, services, processes, systems, engines, or functionality not discussed in detail herein. The blockchain management application 215 is executed to facilitate management of a copy of a blockchain 112 on behalf of the party that operates the computing environment 203. Specifically, the blockchain management application 215 may perform functions such as generating new work product records 106 and adding them to the blockchain 112, propagating updates to other blockchain management applications 215 that integrate with the blockchain 112, receiving updates to the blockchain 112 from other blockchain management applications 215, and other functions.

An instance of the blockchain management application 215 may be considered one node in a distributed network with a plurality of nodes. It is noted that the blockchain 112 may be implemented as a public or private blockchain 112. As a private blockchain 112, only hosts controlled by trusted entities are allowed to have copies of the blockchain 112. As a public blockchain 112, public hosts are allowed to have copies of the blockchain 112 and to participate with functions of the blockchain management application 215.

The document verification service 218 performs verification functions with respect to work product records 106 and documents 103. For example, the document verification service 218 may verify based upon work product records 106 that a given document 103 was in a particular state at a particular time. In addition, the document verification service 218 may confirm the authenticity of a particular work product record 106 based on links to the particular work product record 106 present in subsequent work product records 106. In various embodiments, the document verification service 218 may perform verification with respect to a hash value, an encrypted document, or an unencrypted document being provided for verification.

The version control system 221 may be employed to manage versions of documents 103. The information managed by the version control system 221 may include which users modified the data and which data was modified at a given time. Commercially available examples of version control systems 221 include GIT 2.18.0, APACHE SUBVERSION 1.10.0, and Concurrent Versions System (CVS) 1.11.23 by the CVS Team. The version control system 221 may integrate with the blockchain management application 215 so that a given modification or creation of a document 103 is automatically evidenced in a work product record 106 of the blockchain 112.

The data stored in the data store 212 includes, for example, a copy of a blockchain 112, user data 239, and potentially other data. The blockchain(s) 112 correspond to one or more local blockchain copies for the particular computing environment 203, where it is understood that multiple copies of the blockchain 112 are maintained by different entities for security and consistency. In some embodiments, an organization may maintain both a private blockchain 112 and a public blockchain 112. For example, the private blockchain 112 may include encrypted versions of documents, while the public blockchain 112 may include hash values of documents but not the actual documents themselves for security reasons. However, the public blockchain 112 would be made public for purposes of third-party verification. Thus, multiple blockchains 112 may be maintained that evidence document updates differently.

Each blockchain 112 is made up of work product records 106. The work product records 106 may include an address 245, previous record data 248, a timestamp 251, document evidence 109, and/or other data. The address 245 may correspond to a public key that identifies the particular work product record 106. In one embodiment, the address 245 corresponds to a public key of an originating user or organization. The previous record data 248 includes data that references a previous work product record 106, which may include a cryptographic hash of the previous work product record 106, the address 245 of the previous work product record 106, and/or other data indicating that the present work product record 106 is generated based at least in part on a private key corresponding to the public key or address 245 of the previous work product record 106. Alternatively, the previous record data 248 may simply include a pointer to the previous work product record 106 (e.g., the address 245 of the previous work product record 106) without including a cryptographic hash of the previous work product record 106.

The timestamp 251 corresponds to a time at which the work product record 106 was created or relative to an interval of time corresponding to a modification or update to the documents 103. The document evidence 109 is used to verify the existence or state of a document 103 at a given time. The document evidence 109 may correspond to a hash value of a document 103, a hash value of a difference between the document 103 and a previous version of the document 103, an encrypted version of the document 103, an encrypted version of a difference between the document 103 and a previous version of the document 103, and so on. The cryptographic hash function used to generate the hash values may be selected so that it would be highly unlikely to have a collision between unique documents 103. In some cases, the data may be salted before the hash function is applied.

The user data 239 corresponds to data associated with users or organizations that have originated the work product managed in the blockchain 112. Such data may include data relating to documents 103 created or modified by the user, including addresses 245, private keys 255, and/or other information that can facilitate location of a corresponding work product record 106 in the blockchain 112.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 206 may include a display 257. The display 257 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 260 and/or other applications. The client application 260 may be executed in a client device 206, for example, to access network content served up by the computing environment 203 and/or other servers, thereby rendering a user interface 263 on the display 257. To this end, the client application 260 may comprise, for example, a browser, a dedicated application, etc., and the user interface 263 may comprise a network page, an application screen, etc. Alternatively, the client application 260 may be a special-purpose client, such as a client for the version control system 221, the blockchain management application 215, or the document verification service 218. The client device 206 may be configured to execute applications beyond the client application 260 such as, for example, email applications, social networking applications, word processors, spreadsheets, and/or other applications. Also, the user data 239 or portions thereof may be stored in the client device 206 rather than the computing environment 203 in some embodiments.

Figure 3:
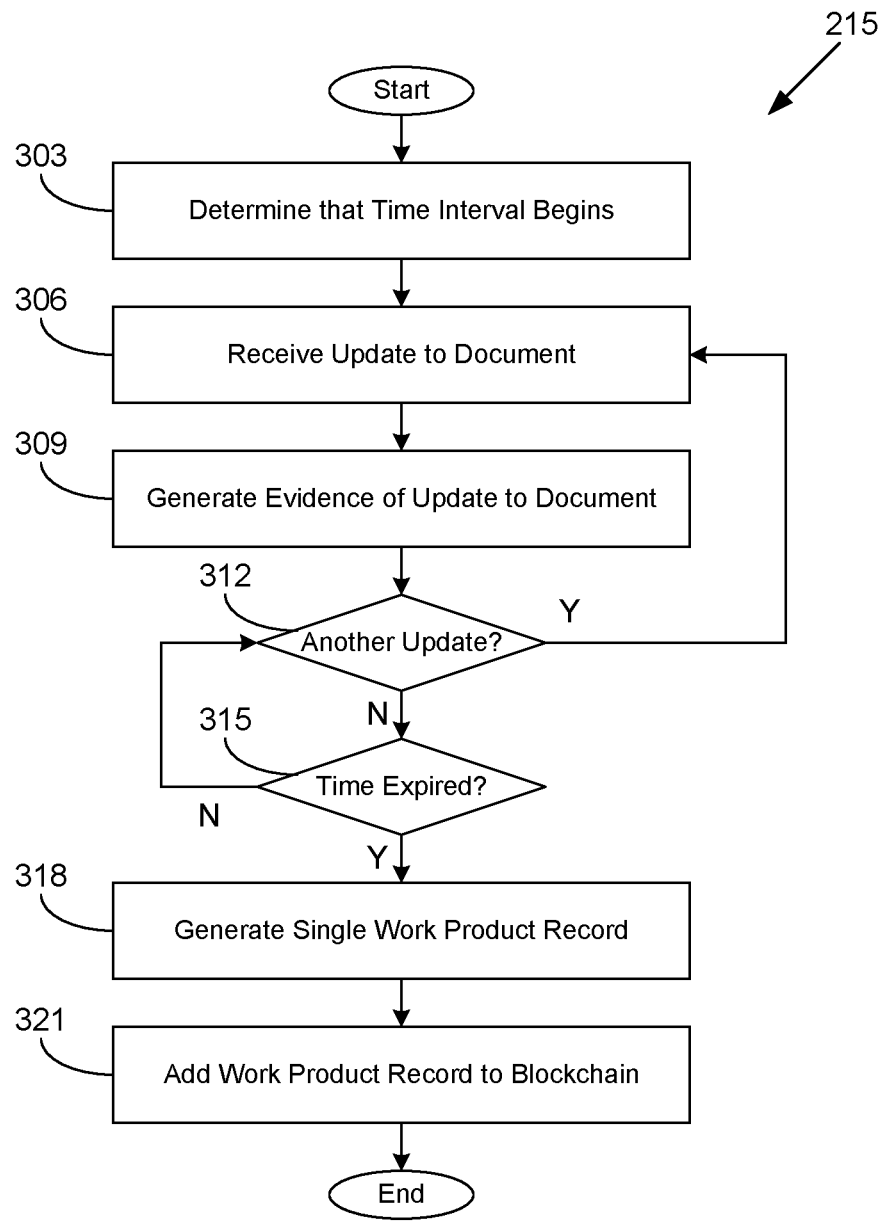
FIG. 3 is a flowchart illustrating one example of functionality implemented as portions of a blockchain management application executed in a computing environment in the networked environment of FIG. 2 according to various embodiments of the present disclosure.

Referring next to FIG. 3, shown is a flowchart that provides one example of the operation of a portion of the blockchain management application 215 according to various embodiments. It is understood that the flowchart of FIG. 3 provides merely an example of the many different types of functional arrangements that may be employed to implement the operation of the portion of the blockchain management application 215 as described herein. As an alternative, the flowchart of FIG. 3 may be viewed as depicting an example of elements of a method implemented in the computing environment 203 (FIG. 2) according to one or more embodiments.

Beginning with box 303, the blockchain management application 215 determines that a time interval has begun. For example, the blockchain management application 215 may determine that the current time is the top of the hour. The time interval may be a predefined time interval (e.g., an hour) or may be a dynamically determined time interval (e.g., a quota of document updates are received in thirty-two minutes), where the time interval may be event driven rather than predefined. In box 306, the blockchain management application 215 receives an update to a document 103 (FIG. 2). For example, the client application 260 (FIG. 2) may be used to save a document 103, thereby either creating the document 103 or modifying an existing document 103. Either the document 103 or the difference between the current version of the document 103 and the previous version of the document 103 may be received.

In box 309, the blockchain management application 215 generates document evidence 109 corresponding to evidence of the current state of the document 103 as modified. For example, the blockchain management application 215 may use a cryptographic hash function (e.g., SHA-1, SHA-2, SHA-3, or another hash function) to generate a hash value on the entire document 103 or the difference between the document 103 and a previous version of the document 103. Alternatively, the blockchain management application 215 may use an encryption key to generate an encrypted version of the entire document 103 or the difference between the document 103 and a previous version of the document 103. The encryption key may be stored in the keys 255 (FIG. 2). Either a symmetric key or an asymmetric key pair may be used. A transformation such as a salt may be applied to the document data before generating the hash value.

In box 312, the blockchain management application 215 determines whether another update to a document 103 is to be received. If another update to a document 103 is to be received, the blockchain management application 215 returns to box 306. If another update is not received, the blockchain management application 215 moves from box 312 to box 315 and determines whether the time interval has expired. The time interval may expire at a predefined time or when it is determined that a particular event occurs. If the time interval has not expired, the blockchain management application 215 moves from box 315 back to box 312 and determines whether another document 103 update is to be received.

If the time interval has expired, the blockchain management application 215 moves from box 315 to box 318. In box 318, the blockchain management application 215 generates a single work product record 106 (FIG. 2) that provides document evidence 109 for the document 103 updates received during the time interval. The single work product record 106 may be generated for all the document 103 updates received within an organization, or all the document 103 updates received by a team or group within the organization. In one embodiment, if multiple updates for the same document 103 are received during the time interval, evidence of the last update may be utilized for the work product record 106. In another embodiment, if multiple updates for the same document 103 are received during the time interval, evidence of two or more of the updates may be utilized for the work product record 106. In generating the work product record 106, the blockchain management application 215 may include a timestamp 251 (FIG. 2) corresponding to the current time or determined relative to the time interval.

In box 321, the blockchain management application 215 adds the work product record 106 to the blockchain 112 (FIG. 2). In doing so, the blockchain management application 215 may generate an address 245 (FIG. 2) for the work product record 106. The blockchain management application 215 may also obtain a previous work product record 106 and compute a hash value on this previous record. The hash value may be stored as the previous record data 248 (FIG. 2).

In another embodiment, the blockchain management application 215 may add a single work product record 106 to a public blockchain 112 and a single work product record 106 to a private blockchain 112. For example, the work product record 106 in the public blockchain 112 may include a hash value of the content of the document 103 and not the actual content, while the work product record 106 in the private blockchain 112 may include the content of the document 103 and/or an encrypted version of that content.

The address 245 or other confirmation data may be returned to the client applications 260 (FIG. 2) that originated the update or may be stored in an index in the user data 239 (FIG. 2). The blockchain management application 215 may generate a new encryption key 255 based upon the expiration of the time interval in order to rotate the key 255 for the next time interval. Thereafter, the operation of the portion of the blockchain management application 215 ends.

Figure 4:
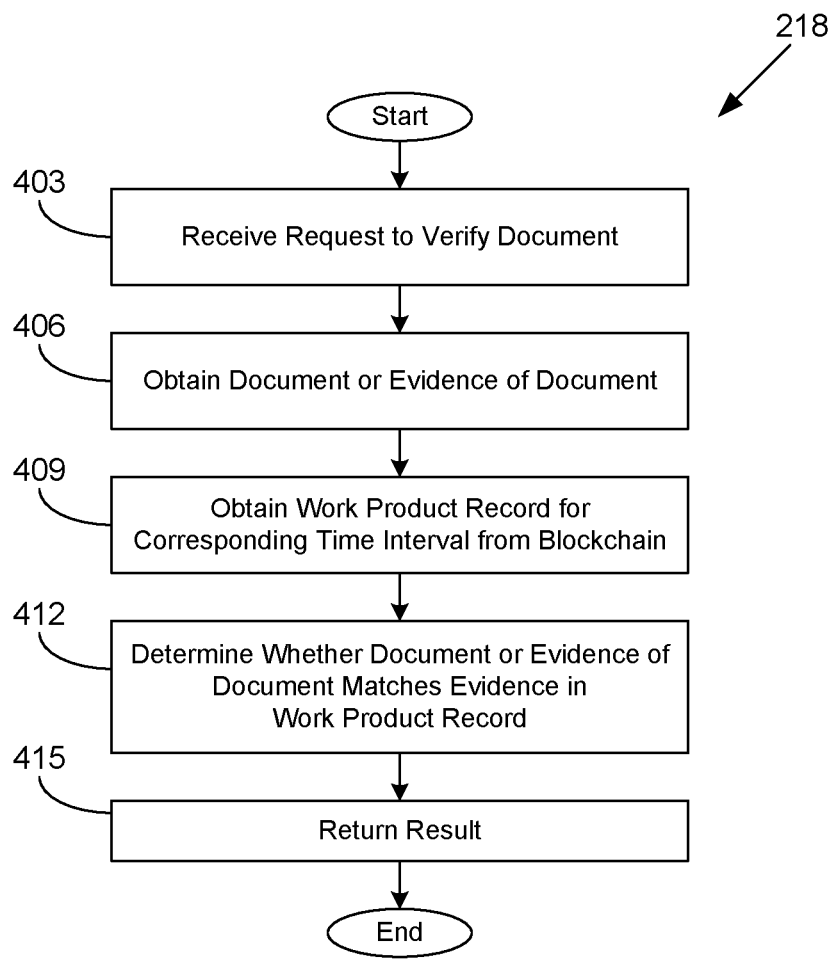
FIG. 4 is a flowchart illustrating one example of functionality implemented as portions of a document verification service 218 executed in a computing environment in the networked environment of FIG. 2 according to various embodiments of the present disclosure.

Moving on to FIG. 4, shown is a flowchart that provides one example of the operation of a portion of the document verification service 218 according to various embodiments. It is understood that the flowchart of FIG. 4 provides merely an example of the many different types of functional arrangements that may be employed to implement the operation of the portion of the document verification service 218 as described herein. As an alternative, the flowchart of FIG. 4 may be viewed as depicting an example of elements of a method implemented in the computing environment 203 (FIG. 2) according to one or more embodiments.

Beginning with box 403, the document verification service 218 receives a request to verify a document 103 (FIG. 2). In box 406, the document verification service 218 obtains a purported copy of the document 103 that is associated with a time in the past. For example, the copy of the document 103 may be uploaded from a client device 206 (FIG. 2) or may be obtained from the user data 239 (FIG. 2). In other embodiments, a difference of the document 103 compared to a previous version may be obtained. Such difference data may be obtained from the version control system 221. In some cases, the document verification service 218 may obtain evidence of the document 103 rather than a copy of the document 103 itself. For example, the client device 206 may upload a hash value corresponding to the content of the document 103 for verification.

In box 409, the document verification service 218 obtains a work product record 106 (FIG. 2) from the blockchain 112 for the corresponding time interval. For example, the request received in box 403 may include the address 245 (FIG. 2) used to uniquely identify the work product record 106. The document verification service 218 may also verify the integrity of the work product record 106 through a subsequent work product record 106 that includes a hash value in the previous record data 248 (FIG. 2).

In box 412, the document verification service 218 determines whether the document 103 (or difference) obtained in box 406 matches the document evidence 109 (FIG. 2) in the work product record 106. For example, the document verification service 218 may compute a hash value of the document 103 (or difference) and compare it to the hash value in the document evidence 109. Alternatively, the document verification service 218 may decrypt the document evidence 109 using a key 255 (FIG. 2) and compare the decrypted document 103 with the obtained document 103 (or difference). If evidence of the document 103 is obtained in box 406 rather than the document 103 itself, the document verification service 218 may compare the obtained evidence from box 406 with the document evidence 109 in the work product record 106. In box 415, the document verification service 218 returns a result indicating whether the document 103 has been verified using the blockchain 112. Thereafter, the operation of the portion of the document verification service 218 ends.

Figure 5:
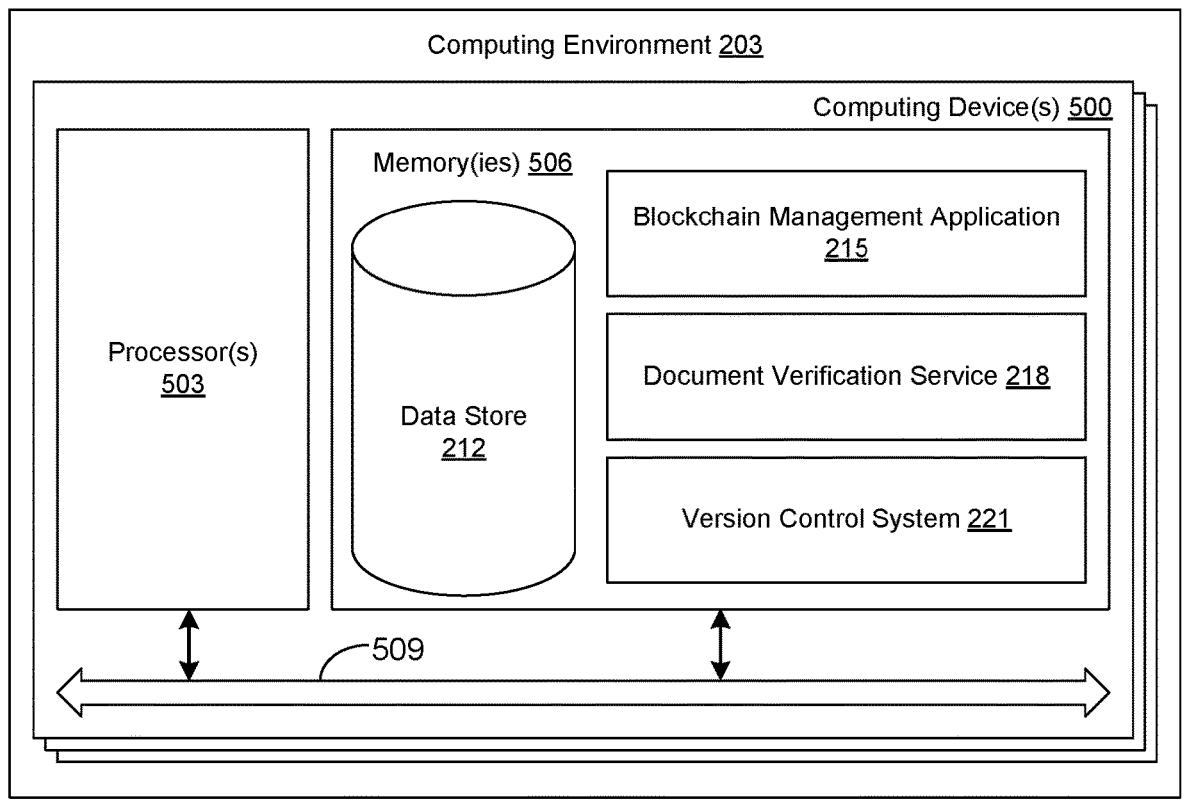
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the blockchain management application 215, the document verification service 218, the version control system 221, and potentially other applications. Also stored in the memory 506 may be a data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the blockchain management application 215, the document verification service 218, the version control system 221, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

The flowcharts of FIGS. 3 and 4 show the functionality and operation of an implementation of portions of the blockchain management application 215 and the document verification service 218. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the blockchain management application 215, the document verification service 218, and the version control system 221, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the blockchain management application 215, the document verification service 218, and the version control system 221, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices 500 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
   generate an encryption key corresponding to a predefined time interval;
   receive a first document modified during the predefined time interval;
   generate an encrypted version of the first document using the encryption key;
   generate a first hash value for content of the first document;
   receive a second document modified during the predefined time interval;
   generate an encrypted version of the second document using the encryption key;
   generate a second hash value for content of the second document;
   determine that the predefined time interval has expired;
   generate a first work product record in a private blockchain, the first work product record including the encrypted version of the first document and the encrypted version of the second document; and
   generate a second work product record in a public blockchain, the second work product record including the first hash value and the second hash value.

2. The non-transitory computer-readable medium of claim 1, wherein the first document and the second document comprise at least one of: a laboratory notebook record or an accounting ledger.

3. The non-transitory computer-readable medium of claim 1, wherein when executed the program further causes the at least one computing device to at least generate a different encryption key corresponding to a subsequent predefined time interval following the predefined time interval.

4. A system, comprising:
   at least one computing device; and
   a blockchain management application executable in the at least one computing device, wherein when executed the blockchain management application causes the at least one computing device to at least:
      receive corresponding updates to a plurality of documents within a time interval; and
      generate a single work product record in a blockchain, wherein the single work product record evidences corresponding states of the plurality of documents at an end of the time interval.

5. The system of claim 4, wherein generating the single work product record further comprises generating respective hashes of individual ones of the plurality of documents, and the respective hashes are stored in the single work product record.

6. The system of claim 4, wherein the corresponding updates to the plurality of documents correspond to respective differences between a current version of individual ones of the plurality of documents and a previous version of the individual ones of the plurality of documents.

7. The system of claim 6, wherein generating the single work product record further comprises generating respective hashes of the individual ones of the corresponding updates to the plurality of documents, and the respective hashes are stored in the single work product record.

8. The system of claim 6, wherein generating the single work product record further comprises generating encrypted versions of the individual ones of the corresponding updates to the plurality of documents, and the encrypted versions are stored in the single work product record.

9. The system of claim 8, wherein the encrypted versions are generated using a key rotated according to the time interval.

10. The system of claim 4, wherein the plurality of documents correspond to all work product for an organization that is recorded by the blockchain management application as being updated during the time interval.

11. The system of claim 4, wherein individual ones of the plurality of documents are updated by a plurality of different users during the time interval.

12. The system of claim 4, wherein a particular document of the plurality of documents is updated a plurality of times during the time interval, but a single state for the particular document is evidenced in the single work product record.

13. The system of claim 4, wherein the blockchain is one of a plurality of blockchains, and a corresponding single work product record is generated separately for individual ones of the plurality of blockchains to differently evidence the corresponding states of the plurality of documents at the end of the time interval.

14. The system of claim 4, wherein the corresponding updates to the plurality of documents are received by the blockchain management application by a version control system.

15. A method, comprising:
   receiving, via at least one of one or more computing devices, a first document;
   generating, via at least one of the one or more computing devices, a first hash value for content of the first document;
   receiving, via at least one of the one or more computing devices, a second document;
   generating, via at least one of the one or more computing devices, a second hash value for content of the second document;
   determining, via at least one of the one or more computing devices, that a time interval has expired; and
   generating, via at least one of the one or more computing devices, a single work product record in a blockchain, the single work product record including the first hash value and the second hash value.

16. The method of claim 15, further comprising:
   receiving, via at least one of the one or more computing devices, an updated version of the first document;
   generating, via at least one of the one or more computing devices, a third hash value for content of the updated version of the first document;
   determining, via at least one of the one or more computing devices, that a subsequent time interval has expired; and
   generating, via at least one of the one or more computing devices, another single work product record in the blockchain, the other single work product record including the third hash value.

17. The method of claim 15, further comprising:
- determining, via at least one of the one or more computing devices, a timestamp relative to the time interval; and
- wherein the single work product record is associated with the timestamp.

18. The method of claim 15, wherein generating the single work product record in the blockchain further comprises:
- determining, via at least one of the one or more computing devices, a hash value of a previous work product record in the blockchain; and
- including, via at least one of the one or more computing devices, the hash value of the previous work product record in the single work product record.

19. The method of claim 15, further comprising:
- receiving, via at least one of the one or more computing devices, a request to verify the first document;
- receiving, via at least one of the one or more computing devices, the single work product record from the blockchain;
- validating, via at least one of the one or more computing devices, the single work product record; and
- comparing, via at least one of the one or more computing devices, the first hash value from the single work product record with a hash value computed for the content of the first document.

20. The method of claim 15, wherein determining that the time interval has expired further comprises determining, via at least one of the one or more computing devices, that a particular event has occurred.

* * * * *